United States Patent
Henderson et al.

(10) Patent No.: US 9,451,230 B1
(45) Date of Patent: Sep. 20, 2016

(54) PLAYBACK ADJUSTMENTS FOR DIGITAL MEDIA ITEMS

(71) Applicant: Google Inc., Mountain View, CA (US)

(72) Inventors: Philip Henderson, Sunnyvale, CA (US); Sajid Saddiqi, Fremont, CA (US)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 14/083,328

(22) Filed: Nov. 18, 2013

Related U.S. Application Data

(60) Provisional application No. 61/786,338, filed on Mar. 15, 2013.

(51) Int. Cl.
  *H04N 9/80* (2006.01)
  *H04N 9/802* (2006.01)

(52) U.S. Cl.
  CPC .................. *H04N 9/802* (2013.01)

(58) Field of Classification Search
  CPC .......... G06F 3/04847; H04N 21/8455; H04N 21/4325
  USPC ........................................ 386/240, 248, 350
  See application file for complete search history.

(56) References Cited

U.S. PATENT DOCUMENTS

2008/0154889 A1\* 6/2008 Pfeiffer ............................ 707/5
2013/0061143 A1\* 3/2013 Eppolito ....................... 715/716

\* cited by examiner

*Primary Examiner* — Thai Tran
*Assistant Examiner* — Jose Mesa
(74) *Attorney, Agent, or Firm* — Fenwick & West LLP

(57) ABSTRACT

An adjustment module analyzes user adjustments in a playback attribute (e.g., volume) of a media item (e.g., a video) that occur when the user transitions from one media item to another. By analyzing these adjustments, the adjustment module determines an adjustment amount to apply to the playback attribute of a media item to cause the media item to appear equivalent to users with respect to the playback attribute when compared with the media item that was previously played.

23 Claims, 9 Drawing Sheets

PLAYBACK ADJUSTMENTS FOR DIGITAL MEDIA ITEMS

BACKGROUND

1. Field of Art

The present invention generally relates to the field of digital media items, and more specifically, to determining attribute adjustments to make during playback of digital media items that will create a consistent viewing experience for the audience of the digital media items.

2. Background of the Invention

When playing digital media items, such as digital videos, audio files, and the like, users will typically play back some number of items consecutively. In many cases the digital media items have different authors and different amounts of a given playback attribute, such as an audio attribute like volume level. For example, in the case of volume level, the effective volume level perceived by a user is a combination of both an explicit volume (amplification) setting adjustable by the user and the recorded signal (e.g. volume) level of the media item being played. Thus, when the user transitions from one video media item to another the effective volume level might change drastically—e.g., from a relatively quiet video suitable for the evening to a disturbingly loud video—due to the different signal levels of the respective media items, even though the user has not adjusted the volume level. In consequence, the user may feel startled or frustrated and is obliged to manually change the volume level to accommodate the inherent volume level of the current video.

SUMMARY

In one embodiment, a computer-implemented method comprises identifying a plurality of transitions of users from playing a first video to playing a second video, and, for each identified transition, determining a first level of volume at which the first video of the transition was played, determining a second level of volume at which the second video of the transition was played, and determining an amount of user volume adjustment based on the first level of volume and the second level of volume. The method further comprises identifying a set of videos involved in at least one of the transitions and, for a plurality of the videos of the set, forming a graph in which each vertex represents one of plurality of videos, and each edge between a pair of vertices represents one of the identified transitions from a first video corresponding to one of the vertices in the pair and a second video corresponding to the other vertex in the pair. The method further comprises forming a spanning tree connecting the plurality of videos of the graph, and, for a given first video of the graph and a given second video of the graph, where no transition was identified between the first video and the second video, determining, using the spanning tree, a playback adjustment amount by which to adjust a volume level of the given second video in order to cause an effective volume level of the second video when played to appear equivalent to an effective volume level of the first video when played.

In one embodiment, a computer-implemented method comprises determining, for a plurality of users and for a plurality of media items played by the users, adjustment amounts by which the users have adjusted a playback attribute when transitioning from first ones of the media items to second ones of the media items, and for a first media item and a second media item of the plurality of media items, determining, using ones of the determined adjustment amounts, an adjustment amount of the playback attribute to apply to the second media item that causes the second media item to appear equivalent to the first media item during playback with respect to the playback attribute.

In one embodiment, a computer-implemented method comprises, for each media item of a plurality of media items, identifying, during playback of the media item, an adjustment by a user in a playback attribute of the media item following a transition to the media item from a directly preceding media item, and determining an adjustment amount in the playback attribute with respect to a measure of the playback attribute during playback of the directly preceding media item. The method further comprises, for a first media item and a second media item of the media items, identifying a first determined adjustment amount between the first media item and the second media item, identifying a second determined adjustment amount between the first media item and a third media item, or the second media item and the third media item, and determining, using the first and second determined adjustment amounts, a playback adjustment amount of the playback attribute to apply to the second media item that causes the second media item to appear equivalent to first media item during playback with respect to the playback attribute.

In one embodiment, a non-transitory computer-readable storage medium stores instructions executable by a processor, the instructions comprising instructions for, for each media item of a plurality of media items, identifying, during playback of the media item, an adjustment by a user in a playback attribute of the media item following a transition to the media item from a directly preceding media item, and determining an adjustment amount in the playback attribute with respect to a measure of the playback attribute during playback of the directly preceding media item. The instructions also comprise instructions for, for a first media item and a second media item of the media items, identifying a first determined adjustment amount between the first media item and the second media item, identifying a second determined adjustment amount between the first media item and a third media item, or the second media item and the third media item, and determining, using the first and second determined adjustment amounts, a playback adjustment amount of the playback attribute to apply to the second media item that causes the second media item to appear equivalent to first media item during playback with respect to the playback attribute.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
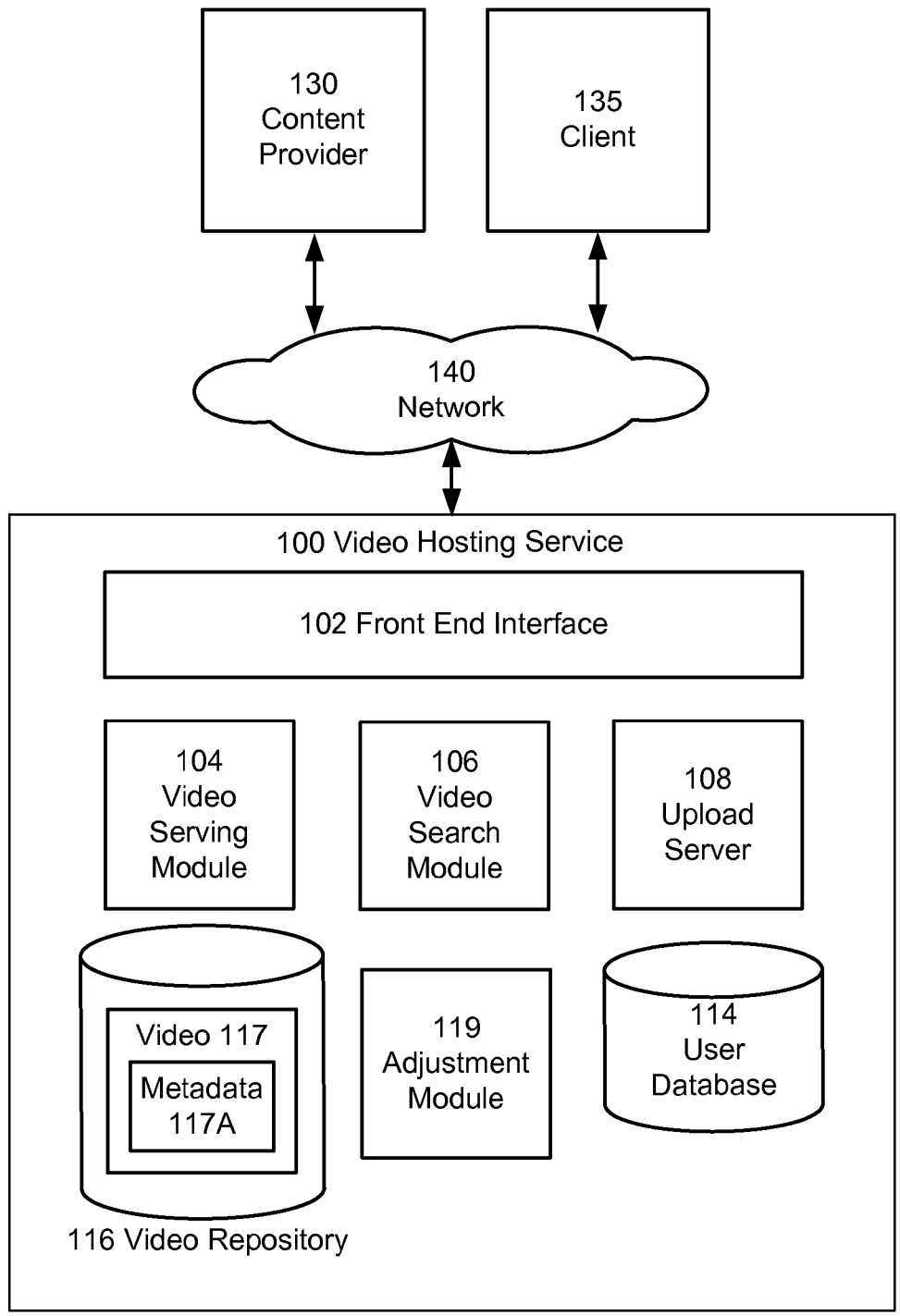
FIG. 1 is a block diagram of a video hosting service in which media playback attribute adjustment can be performed, according to one embodiment.

FIG. 1 is a block diagram of a video hosting service 100 in which media playback attribute adjustment can be employed, according to one embodiment. It is appreciated that media playback attribute adjustment may also be performed in the context of other types of systems, such as audio streaming systems or (more generally) any system that provides media files to users, and is not limited to use in the specific context illustrated in FIG. 1 for purposes of example.

The video hosting service 100 represents a system such as that of YOUTUBE™ that stores and provides videos to clients such as the client device 135, including both user-generated videos and commercially/professionally generated ones. The video hosting service 100 communicates with a plurality of content providers 130 and client devices 135 via a network 140 to facilitate sharing of video content between users. Note that in FIG. 1, for the sake of clarity only one instance of content provider 130 and client 135 is shown, though there could be any number of each. The video hosting service 100 additionally includes a front end interface 102, a video serving module 104, a video search module 106, an upload server 108, a user database 114, and a video repository 116. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE website, found at www.youtube.com. Other video hosting services are known, as well, and can be adapted to operate according to the teachings disclosed herein; similarly, systems which host audio recordings can be adapted to be operated as described herein. The illustrated components of the video hosting service100 can be implemented as single or multiple components of software and/or hardware. In general, functions described in one embodiment as being performed by one component can also be performed by other components in other embodiments, or by a combination of components. Furthermore, functions described in one embodiment as being performed by components of the video hosting service100 can also be performed by one or more clients 135 in other embodiments if appropriate.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a cellular, mobile, or smart phone, or a laptop computer.

The network 140 is typically the Internet, but may be any network, including but not limited to a LAN, a MAN, a WAN, a mobile wired or wireless network, a cloud computing network, a private network, or a virtual private network. Client device 135 may comprise a personal computer or other network-capable device such as a personal digital assistant (PDA), a mobile telephone, a pager, a television "set-top box," and the like.

Conceptually, the content provider 130 is an entity that provides video content to the video hosting service 100 and the client 135 views that content. In practice, some content providers (e.g., individual users who upload user generated content) may also be content viewers. Additionally, the content provider 130 may be the same entity that operates the video hosting service 100.

The content provider 130 operates a client device to perform various content provider functions. Content provider functions may include, for example, uploading a video file to the video hosting service 100, editing a video file stored by the video hosting service 100, or editing content provider preferences associated with a video file.

The client 135 operates on a device to view video content stored by the video hosting service 100. Client 135 may also be used to configure viewer preferences related to video content. In some embodiments, the client 135 includes an embedded video player such as, for example, the FLASH player from Adobe Systems, Inc. or any other player adapted for the video file formats used in the video hosting service 100. Note that the terms "client" and "content provider" as used herein may refer to software providing client and content providing functionality, to hardware on which the software executes, or to the entities operating the software and/or hardware, as is apparent from the context in which the terms are used.

The upload server 108 of the video hosting service 100 receives video content from a content provider 130, and processes the content for storage and playback. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest, or may browse videos using functionality such as playlists, channels, or recommendations. Front end interface 102 provides the interface between client 135 and the various components of the video hosting service 100.

In some embodiments, the user database 114 is configured for maintaining a record of all registered users of the video hosting service 100. Registered users include content providers 130 and/or users of clients 135 who simply view videos on the video hosting service 100. Each content provider 130 and/or individual user registers account information including, which may include login name, electronic mail (e-mail) address and password with the video hosting service 100, and is provided with a unique user ID. The user ID can be based on any identifying information, such as the user's IP address, user name, or the like. This account information is stored in the user database 114. Users have the opportunity to specify that the account information not be shared with other components of the video hosting service 100, or with other third-party systems.

The video repository 116 contains a set of videos 117 submitted by users. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, WebM, and can be encoded using video codecs such as VP8, MPEG-2, MPEG-4, H.264, and the like.

In addition to their audiovisual content, the videos 117 further have associated metadata 117A. In one embodiment, the metadata 117A includes textual metadata such as a video title, a video description, and/or tags provided by a user who uploaded the video, as well as user comments provided by users viewing the video. The metadata 117A may also include an uploader-specified category designating one of a set of categories specified by the video hosting service 100, such as sports, entertainment, music, or the like. Although such textual metadata are typically provided by the video uploader and/or other users, they may also be provided or modified automatically by the video hosting service 100.

The video hosting service 100 further comprises an adjustment module 119 that determines an amount by which to adjust a given media attribute when transitioning from a first media item to a second media item in order to equalize the appearance or perception of the given media attribute to the user at time of playback, and is one means for performing this function. For example, the adjustment module 119 may be configured to analyze previous user volume adjustments for different videos in order to equalize the perceived volume of the different videos, even if one of the videos has greater inherent signal (volume) levels than the other and hence a different perceived degree of loudness when the videos are played at the same volume setting. The adjustment module 119 can also apply the determined adjustment amounts when the user transitions from playing a first media item to a second media item, even if no user of the service 100 has previously transitioned directly from the first media item to the second media item. The adjustment module 119 is now described in greater detail.

Figure 2:
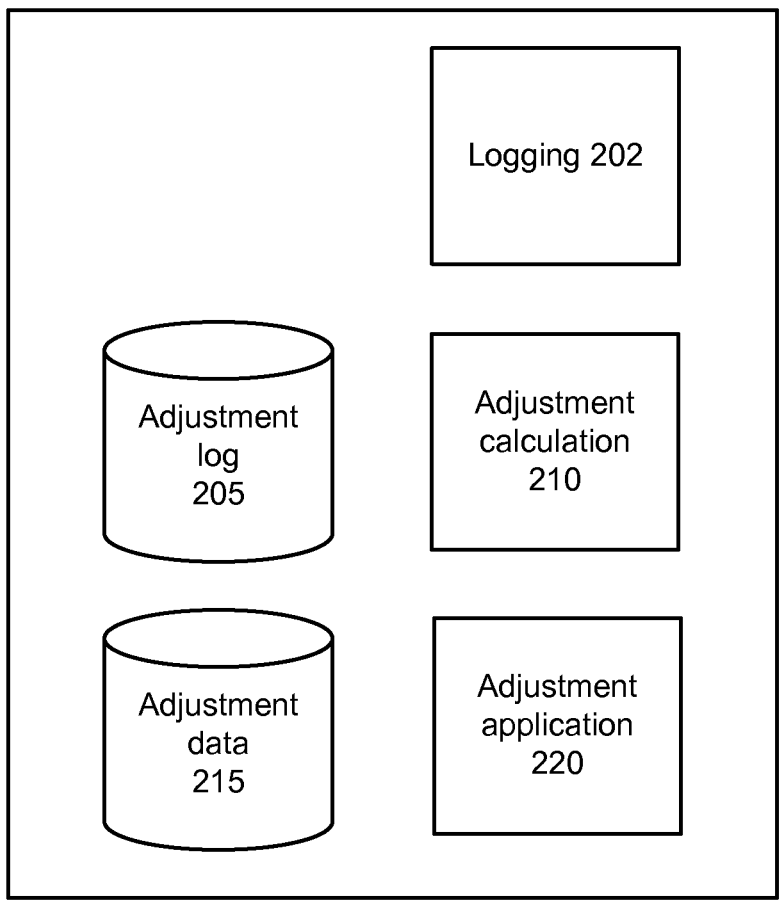
FIG. 2 illustrates the various components of an adjustment module used in the video hosting service, according to one embodiment.

FIG. 2 illustrates the various components of the adjustment module 119, according to one embodiment. The adjustment module 119 comprises an adjustment log 205 that stores data on prior observed adjustments by users of video volume level for each content item, as well as a logging module 202 used to compile the data in the log 205. (In order to provide a concrete example, the remainder of this specification is in the context of analyzing changes in volume level across the videos. However, it is appreciated that the media items that are analyzed need not be videos, and the media playback attributes need not be video volume level. For example, the media items could be audio files, and the media playback attributes could be the amount of bass of the audio files, or the audio balance. As another example, the media files could be video files, and the media playback attributes could be the picture brightness.) An adjustment calculation module 210 analyzes the data in the adjustment log 205 to derive computed adjustment data 215 that specifies how to adjust the volume level between videos in order to minimize the user perception of volume change when transitioning between videos. The adjustment module 119 further comprises an adjustment application module 220 that applies the computed adjustment data 215 at runtime to appropriately adjust the volume level when transitioning from one video to another, and is one means for performing this function. The various components of the adjustment module 119 are now described in more detail.

The adjustment log 205 stores data describing adjustments in the volume level that take place when a user transitions from playing a first video to playing a second video. (In one embodiment, the adjustments in the volume level for which data is stored in the adjustment log 205 may include adjustments that indicate no change in the volume level, i.e., that although a transition took place between a first video and a second video, the volume level was not changed.) The logging module 202 can add data on a transition to the adjustment log at the time that the transition takes place, or at a later time, e.g., based on analysis of a log listing video plays, volume settings, and other video events. (The term "transition" is used herein to describe the playing of one media item, such as a digital video, directly followed by the playing of another media item. A transition "from" media item 1 "to" media item 2 denotes playing of item 1 directly followed by playing of item 2; a transition "between" item 1 and item 2 denotes either a transition from item 1 to item 2, or from item 2 to item 1.) That is, in one embodiment a single volume adjustment is described with the tuple <user, $video_1$, $video_2$, user adjustment, automatic adjustment>, where "user" represents a unique identifier of the user (e.g., such as a username or other user identifier on the video hosting service 100, or a session key), "$video_1$" represents a unique identifier of the video previously being played and "$video_2$" represents a unique identifier of the video that was played directly after "$video_1$" (hence, the volume adjustment is for the transition $video_1 \rightarrow video_2$), "user adjustment" represents a relative amount of the adjustment in the volume level manually made for "$video_2$" by a user (e.g., +20% or 1.2, indicating that the volume level was increased by 20% for "$video_2$" relative to the volume level for "$video_1$"), and "automatic adjustment" represents a relative amount of the adjustment in the volume (if any) that was automatically applied by the adjustment application module 220 before the user adjustment was made. The adjustment log 205 stores a collection of such tuples.

In one embodiment, each tuple corresponds to a single volume adjustment. In other embodiments, each tuple corresponds to an aggregate volume adjustment made by the associated user when transitioning from $video_1$ to $video_2$. The aggregate volume adjustment may be computed in different manners, such as using time-weighted averaging. As a simple example, if the volume of $video_1$ was at level 10 for the first half of the video and at level 14 for the second half (for a time-weighted average volume of (0.5*10+ 0.5*14)=12, and then the volume was set to level 6 almost immediately for $video_2$ and remained at that level throughout playback (i.e., for an average weighted volume of 6), the logged adjustment would be approximately (6−12)/12=−50%.

In one embodiment, the adjustment may have been performed in different manners. For example, the adjustment may have been performed using a volume control in an application-specific user playback interface provided by the video hosting service 100, such as in a YOUTUBE volume slider control that is part of the standard video playback controls. Since such a volume control is provided by the video hosting service 100 itself, the logging module 202 can directly monitor and log such adjustments. Alternatively, the logging module 202 may provide components that allow it to monitor volume adjustments performed in other manners, such as by adjusting the global volume of the operating system that the user is using at the time of the volume adjustment. For example, the logging module 202 could provide a browser plug-in that when installed on a client 135 queries the operating system for the current operating system volume level and reports the results to the logging module 202. (The user of the client 135 may specify that the volume data not be logged by the video hosting service 100.) The adjustment may also have been automatically applied by the adjustment application module 220, based on earlier calculations of the adjustment calculation module 210.

In embodiments where the adjustment may have been performed in different manners, the logged tuple could include an identifier of the manner in which volume was adjusted, such as using the volume control of the online user playback interface of the video hosting service 100, or by using the global operating system volume. The user volume adjustment amount may then be computed as the product of the different types of volume adjustment, such as 1.2*1.0=1.2 if the application-specific volume was increased by 20% while the operating system volume remained unchanged, or 1.2*1.1=1.32 if the application-specific volume was increased by 20% and the operating system volume was increased by 10%.

In some embodiments, the logging module 202 performs filtering and/or weighting of the data in the adjustment log 205. The filtering and/or weighting may be performed based on different properties of the transitions, such as the user performing the transition, the media items in the transition, or the manner of the adjustment itself. One type of possible user-oriented filtering and/or weighting pertains to transitions associated with users who have otherwise rarely been seen to adjust volume, on the assumption that they may be adjusting volume using techniques not measurable to the logging module 202 (e.g., adjusting volume via a physical speaker knob) or that they are not sensitive to volume changes and hence their volume adjustment data is not applicable to other, more sensitive users. One type of possible media item-oriented filtering and/or weighting pertains to transitions associated with media items that are rarely played, on the assumption that they provide little volume adjustment data for computing the proper volume adjustment. Possible adjustment manner-oriented filtering and/or weighting pertain to volume adjustments that frequently are for purposes other than actual volume control (e.g., volume mutings, which may merely signal interruptions), volume adjustments that reach the maximum setting (e.g., merely signaling a minimum-desired volume level rather than the actual level), and "non-adjustments" (i.e., transitions without a volume adjustment, which may merely signal failure of the user to make the effort to change the volume level, rather than that the volume level was actually acceptable).

In any of these cases, the logging module 202 may simply exclude the associated volume adjustment data from the adjustment log 205. Alternatively, the logging module 202 may associate weights with each adjustment, down-weighting adjustments that are less likely to provide useful data. Additionally, weights can be associated with the logged adjustments and reduced to signal older adjustments, thereby making more recent adjustments more significant.

The adjustment calculation module 210 analyzes the data in the adjustment log 205 and determines the proper relative amount of adjustment to apply when transitioning between any given pair of videos—that is, how much to adjust the volume when playing back the second video of the pair, given the prior volume level of the first video of the pair. The adjustment calculation module updates the computed adjustment data 215 as a result of its calculations. The adjustment calculation module 210 may execute at different times in different embodiments, such as after data for some number of additional transactions has been logged (e.g., 500 new transitions), or after some period of time has elapsed (e.g., a week). The adjustment calculation module 210 may use different calculation techniques in different embodiments, as are described below with respect to FIGS. 3A-3E.

The adjustment application module 220 automatically applies the computed adjustment data 215 produced by the adjustment calculation module when a user of the video hosting service 100 is transitioning from one video to another, thereby producing a perceived volume level for the current video that approximates that for the video played directly before. In one embodiment, the adjustment application module 220 implements the volume adjustment solely by adjusting the application-specific volume setting of the interface provided by the video hosting service 100. In other embodiments, if the adjustment application module 220 has the ability to control other volume sources (e.g., the operating system volume level of the client 135 via browser plug-ins), then the volume may additionally and/or alternatively be adjusted using those other volume sources, as well.

Any further adjustments made by a user, in addition to those automatically applied by the adjustment application module 220 using the computed adjustment data 215, may be logged in the adjustment log and used by the adjustment calculation module 210 to further refine the computed adjustment data 215.

The various techniques performed by the adjustment calculation module 210 in different embodiments are now discussed.

Figure 3A:
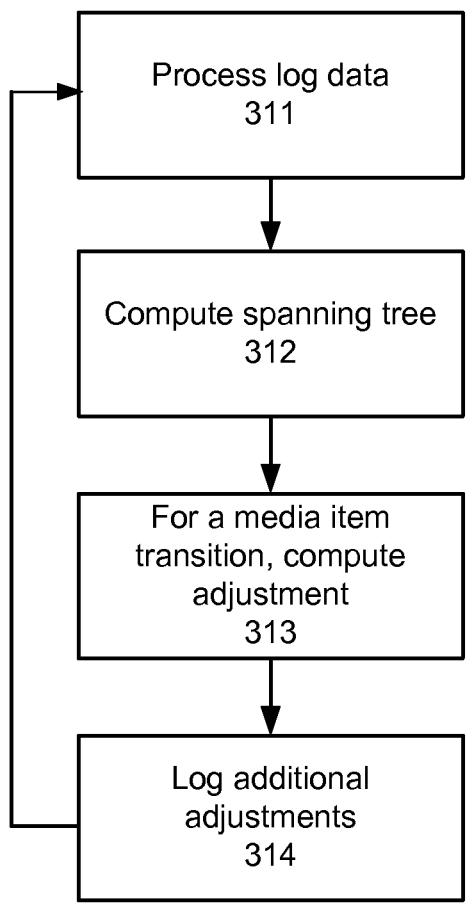
FIGS. 3A-3E are flowcharts illustrating various techniques for determining how to adjust volume or other playback attributes, according to different embodiments.

FIG. 3A is a flowchart that illustrates the operations involved in a spanning-tree-based technique employed by the adjustment module 119 in one embodiment. The adjustment calculation module 210 first processes 311 data from the adjustment log 205 for use in forming a graph G, in which each vertex V represents one of the videos 117, and each edge E between vertices $v_1$ and $v_2$ represents a degree of confidence in the observed volume adjustments (if any) when transitioning between the pair of videos corresponding to those vertices.

In one embodiment, the degree of confidence is represented as the number of transitions between the first video of the pair and the following video of the pair. As a simplified example, the recorded tuples in the adjustment log 205 might be represented by the data of Table 1, below, for the six videos $v_1$ to $v_6$. The entry at row $v_i$, column $v_j$ represents (a) the number of logged transitions from video $v_i$ to video $v_j$ (or from $v_j$ to $v_i$, since volume changes from $v_j$ to $v_i$ can be easily converted to equivalent changes from $v_1$ to video $v_j$ simply by computing the inverse), and (b) the aggregate amount of volume adjustment for the logged transitions from video $v_i$ to video $v_j$. (In one embodiment, the aggregate amount of volume adjustment takes into account the amounts of volume adjustment automatically applied by the adjustment application module 220 before the volume adjustments by the users. For example, in the case of one particular sample adjustment, if the adjustment application module 220 reduced the volume by 20%, and then the user increased the volume by 10%, then the overall amount of volume adjustment for that particular adjustment would be a 12% reduction in volume, i.e., a volume multiplier of 1.0*(1.0−0.2)*(1.0+0.1)=0.88.)

TABLE 1

| | $v_1$ | $v_2$ | $v_3$ | $v_4$ | $v_5$ | $v_6$ |
|---|---|---|---|---|---|---|
| $v_1$ | | 6 [+ 10%] | 5 [+ 20%] | 1 [+ 25%] | 4 [- 5%] | 2 [+ 10%] |
| $v_2$ | | | 1 [- 20%] | 3 [- 10%] | 0 | 1 [- 15%] |
| $v_3$ | | | | 0 | 0 | 1 [+ 10%] |
| $v_4$ | | | | | 1 [- 20%] | 2 [- 20%] |
| $v_5$ | | | | | | 5 [- 10%] |
| $v_6$ | | | | | | |

The data in Table 1 indicate, for example, that there were 6 logged transitions between video $v_1$ and video $v_2$ (including transitions from $v_2$ to $v_1$, as well as those from $v_1$ to $v_2$), 3 transitions from $v_2$ to $v_4$ (or from $v_4$ to $v_2$), etc. This tabular data may equivalently be envisioned as a graph G, where the edge between vertex $v_1$ and $v_2$ has the value 6, for example. (Hence, assembling data in a form such as that of Table 1 is one manner of forming the graph G and is provided for purposes of example. In other embodiments, in order to reduce the number of entries required to represent the graph G—particularly where the vast majority of video pairs have no transition data—an adjacency list representation is alternatively employed. One of skill in the art would appreciate than many different representations of the graph G are possible; references herein to "forming a graph" should be understood to include any one of these different representations.) The data may further include aggregate adjustment data such as average volume adjustments. For example, the entry at row $v_1$, column $v_2$ indicates that of the average volume level adjustment was an increase in volume of 10%, representing that $v_2$ has a lesser signal level/volume than $v_1$, requiring viewers of $v_2$ to increase the volume by 10% to achieve the same perceived degree of loudness.

The amount of data in Table 1 can consume a prohibitively large amount of memory where there are many videos, e.g., tens or hundreds of millions. Accordingly, in order to reduce the amount of data, the adjustment calculation module 210 computes 312 a spanning tree and stores the spanning tree as a reduced corresponding graph G'. In one embodiment, the adjustment calculation module 210 more specifically computes the maximum spanning tree G' of the graph G—that is, the tree that maximizes the total weight of the spanning tree, thereby maximizing the aggregate confidence values (the edge weights) across the tree. (The maximum spanning tree can be obtained by computing the minimum spanning tree using the negations of the confidence values, for example.) For example, FIG. 4 illustrates a maximum spanning tree 400 for the data in Table 1, above.

With the spanning tree computed 312, the adjustment application module 220 can apply the data in the spanning tree G' to adjust 313 the volume when transitioning between any given first video $v_i$ and a subsequent video $v_j$, regardless of whether there were many (or any) observed transitions from $v_i$ to $v_j$ stored in the adjustment log. To properly adjust the volume level, the adjustment application module 220 first determines an aggregate adjustment amount based on the individual amount of adjustment (i.e., gain) of the video pairs along the path in the spanning tree G' from $v_i$ to $v_j$. In one embodiment, the aggregate adjustment amount is the product of the amounts of adjustment corresponding to the edges and the path. In one embodiment, the adjustment calculation module 210 pre-computes the aggregate amount of adjustment for the transition between every pair of videos and stores it for future use in the computed adjustment data 215, thereby avoiding the need to compute the aggregate amount of adjustment each time that a volume adjustment is requested when transitioning between videos.

Figure 4:
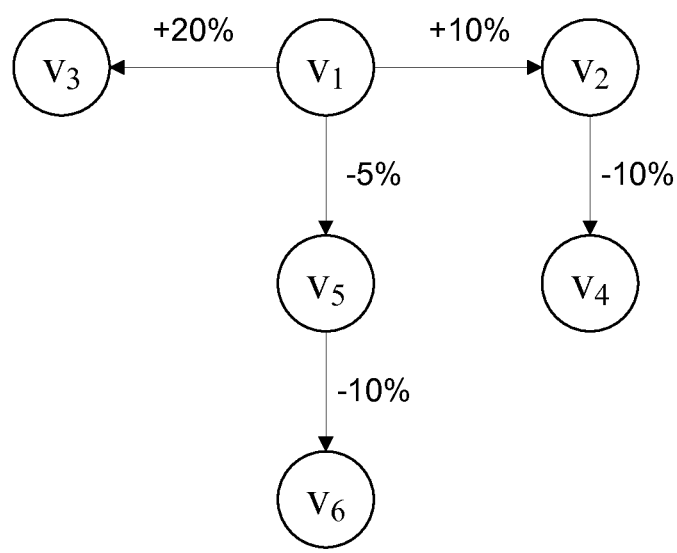
FIG. 4 illustrates an example spanning tree for sample data associated with FIG. 3A.

Continuing the above specific example, although the adjustment data in Table 1 does not include any adjustment data for transitions directly from $v_3$ to $v_5$, the spanning tree 400 of FIG. 4 can be applied to determine an adjustment amount to apply to the volume level while viewing $v_3$ in order to produce an equivalent perceived volume level for $v_5$. Namely, the path from $v_3$ to $v_1$ indicates an increase of 20% when transitioning from $v_1$ to $v_3$ (i.e., a volume multiplier of 1.2), and hence a volume multiplier of approximately 0.83 (i.e., the ratio 1/1.2) when transitioning in the opposite direction, from $v_3$ to $v_1$. Similarly, the path from $v_1$ to $v_5$ indicates a decrease of 5% (i.e., a volume multiplier of 1−0.05=0.95) when transitioning from $v_1$ to $v_5$. Hence, the aggregate volume level multiplier when transitioning from $v_3$ to $v_5$ is approximately 0.83*0.95=0.79, representing a drop in volume of approximately 21%. Since the individual volume multipliers imply that $v_1$ is inherently louder than $v_3$, and that $v_5$ is in turn inherently louder than $v_3$, this substantial volume reduction is necessary to achieve a similar perceived volume level for the viewer when playing $v_5$ as when playing $v_3$.

Any further adjustments performed by users, in addition to the adjustments automatically-applied by step 313, may be logged 314, and steps 311-313 repeated at some later time to further refine the automatic adjustments. For example, steps 311-313 may be repeated at a fixed interval, such as daily or weekly.

Figure 3B:
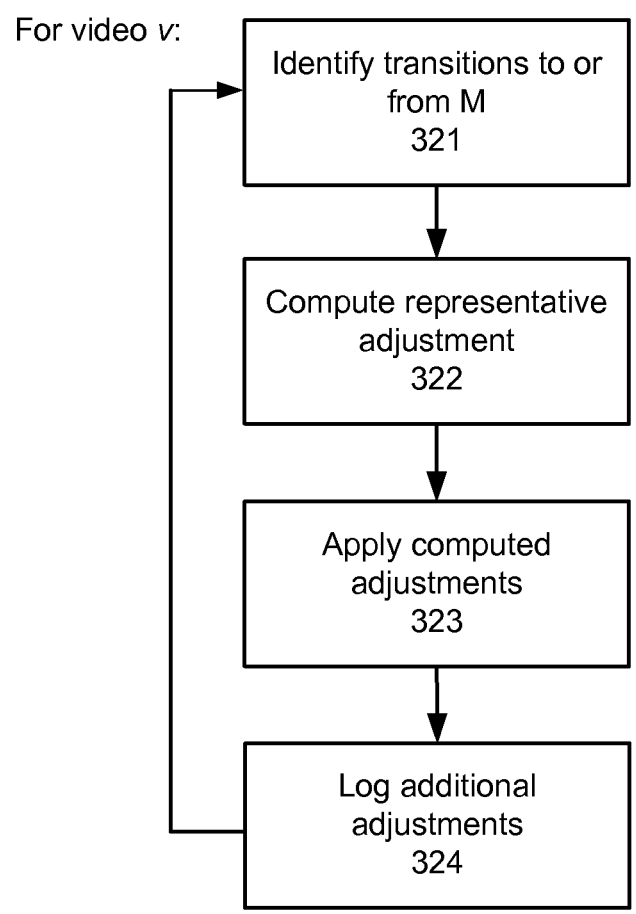

FIG. 3B is a flowchart that illustrates the operations involved in a second, alternative technique employed by the adjustment module 119 in one embodiment.

Initially, for each video v the adjustment calculation module 210 identifies 321 the transitions in the adjustment log 205 for which v is either the source or the target of the transition. (Note that in cases where v is the target of the transition—that is, when the volume was changed while v was being viewed, relative to the volume level of the previous video—the logged volume adjustment amount is equivalent to the inverse of those in which v is the source of the transition. For example, if the volume was adjusted by +25%=1.25 when transitioning to v from some other video, the equivalent adjustment when transitioning from the other video to v is 1/1.25=0.8, a 20% decrease.) Using the identified transition records for the video v, the adjustment calculation module 210 calculates 322 the average adjustment amount for v, $a_v$, and stores it as part of the computed adjustment data 215. This average adjustment amount $a_v$ represents the amount by which one would expect to adjust the volume after viewing an arbitrary video in order to achieve a similar perceived volume level for the video v. The result of steps 321 and 322 is a set of average adjustment (equivalently, "gain") amounts $a_v$, for every video v.

In some embodiments, in order to mitigate the risk of values for $a_v$ that cause the volume level to be adjusted too far in some cases—e.g., increasing the volume by too great an amount, causing the user to be startled—the adjustment calculation module 210 reduces the magnitude of the values of $a_v$, e.g., applying a dampening factor less than 1.0, such as 0.5, to each value $a_v$, before storing it as part of the computed adjustment data 215.

After the computation of a given adjustment amount $a_v$, the adjustment application module 220 applies 323 the adjustment amount $a_v$ whenever the video hosting service 100 determines that a user is transitioning to v from, or from v to, any other video. To perform the adjustment, the adjustment application module 220 sets the new volume level to the product of the existing volume level and the calculated value $a_v$ that corresponds to v. In one embodiment, when a user is transitioning from some video $v_1$ to another video $v_2$, the adjustment application module 220 applies $a_{v-2}$, the calculated value $a_v$ for $v_2$; in other embodiments, the adjustment application module instead applies $(1/a_{v-1})$.

In some embodiments—particularly in those in which the calculated values $a_v$ are reduced by a dampening factor—the adjustment calculation module 210 continues to refine the values $a_v$. Specifically, the logging module 202 continues to update the adjustment log 205 with the volume adjustments observed after the adjustment application module 220 began to apply the present values $a_v$. (It is expected that the magnitude of the subsequent adjustments recorded in the adjustment log 205 will be lower than they were before application of the present values $a_v$, since the values $a_v$ should already have reduced or eliminated the need to further adjust the volume level.) At some later point, e.g., after the lapse of a fixed time interval or after a fixed number of additional volume adjustments, the adjustment calculation module 210 again identifies 321, for each video v, the transitions to v. The effective adjustment amount for each logged adjustment is the product of the adjustment amount $a_v$ in effect at the time of the logged adjustment and the actual observed adjustment amount specified by the user. Symbolically, for every video v, $a_v\_new = a_v\_old *$ userAdjustments, where userAdjustments quantifies the relative amounts of adjustment (e.g., the average adjustment) made by the users in addition to the automatic adjustments made by applying $a_v\_old$. For example, if the adjustment amount $a_v$ in use at the time of the adjustment was a factor of 1.5, and the user decreased the volume to 75% of its (automatically adjusted) value, then the aggregate relative amount of adjustment was a factor of 1.5*0.75=1.125, a 12.5% increase in volume of the video v with respect to its intrinsic volume.

Figure 3C:
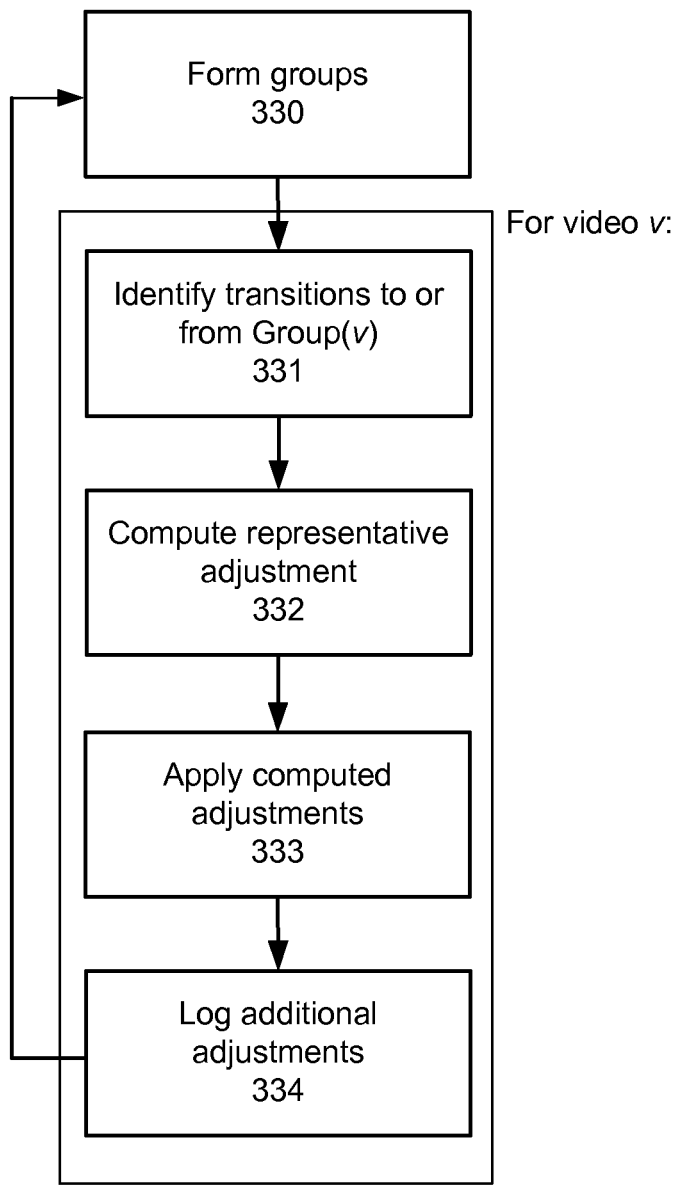

FIG. 3C is a flowchart that illustrates the operations involved in a third, alternative technique employed by the adjustment module 119 in one embodiment.

The technique of FIG. 3C modifies that of FIG. 3B by reducing the number of entries through the use of groups. Specifically, the adjustment calculation module 210 initially forms 330 groups by identifying sets of videos 117 having similar intrinsic volume levels. To do so, the adjustment calculation module 210 identifies transitions recorded in the adjustment log 205 where the amount of adjustment is consistently low, as evaluated according to a given similarity criterion. For example, in one embodiment a pair of videos is considered to satisfy the similarity criterion and thus to belong to the same volume group if there were at least 1000 recorded transitions between the videos and at least 99% of those transitions involved no volume adjustment. The sets are further transitively expanded by adding to a given volume group a video not already in to that group if the video satisfies the similarity criterion with respect to any other video already in the group. In one embodiment, every video is compared to every other video for grouping purposes, thereby grouping the videos in a single pass. In another embodiment, in order to reduce the number of comparisons only videos with a significant number of transitions between them are considered for grouping purposes.

Having formed groups with similar volume, the adjustment calculation module 210 performs operations similar to those of the prior embodiment described with respect to FIG. 2B. Specifically, for each video v the adjustment calculation module 210 identifies 331 transitions from the adjustment log 205 either to or from the volume group of which v is a member. For example, if v is a member of a volume group also containing videos $v_2$ and $v_{11}$, then the adjustment calculation module 210 not only identifies the logged transitions to or from v itself, but also those to or from $v_2$ or $v_{11}$.

The adjustment calculation module 210 further computes 322 a relative amount of adjustment that is representative of the identified transitions as a whole. For example, in one embodiment the representative adjustment is computed as the average relative amount of adjustment $a_{G(v)}$, i.e., the sum of the adjustments for all of the identified transitions, divided by the number of the identified transitions. This adjustment $a_{G(v)}$ is then representative of the volume group as a whole.

The adjustment application module 220 then applies 333 the computed representative adjustments $a_{G(v)}$ whenever a user of the video hosting service 100 is transitioning between videos. For example, when a user is transitioning from a video $v_1$ to a video $v_2$, the adjustment application module 220 could look up the volume group to which $v_2$ belongs, identify the corresponding adjustment value $a_{G(v2)}$ for that group, and multiply the user's current volume level by that adjustment value to obtain the automatically adjusted volume level to use while viewing $v_2$. (Alternatively, the adjustment application module 220 could look up the volume group to which $v_1$ belongs, identify the corresponding adjustment value $a_{G(v1)}$ for that group, and multiply the user's current volume level by the reciprocal of that adjustment value.)

The adjustment module 119 may then continue to refine the computed $a_{G(v)}$ values by logging 334 any additional volume adjustments made by users after the volume level is automatically adjusted. At some later point—e.g., after some number of additional transitions have been observed and logged—the adjustment calculation module 210 repeats steps 330-334. This involves re-forming 330 the groups as needed to account for any changes in the effective volume levels of the videos. Since the computed adjustments $a_{G(v)}$ tend to reduce the need for users to adjust volume levels, the groups should likewise tend to merge into a smaller number of distinct volume-similar groups over time. In one embodiment, the merger of groups can be expressed as a hierarchical structure (e.g., a tree). The hierarchical structure allows tracking, for each video, the net adjustment value needed to adjust the volume of a video to that of its current group. For example, assume that a group $G_1$ and a group $G_2$ have become volume-similar after the computation of their respective adjustment values $a_{G1}$ and $a_{G2}$ (e.g., −10% and +9%, respectively), a new group G' may be formed, having $G_1$ and $G_2$ as its child groups. The hierarchical structure will indicate, for each video in G1, that its volume must be adjusted by −10% to be in group G', for example. Further assume that subsequent transitions from group G' to videos not in G' indicate an average adjustment value of −5%. Then the appropriate net adjustment value from a video in $G_1$ to a video not in G' is −10%*−5% (i.e., the −10% adjustment from $G_1$ to G', and the −5% adjustment from G' to the video not in G'). Similarly, the appropriate net adjustment value from a video in $G_1$ to a video not in G' is +10%*−5%≈5%.

Figure 3D:
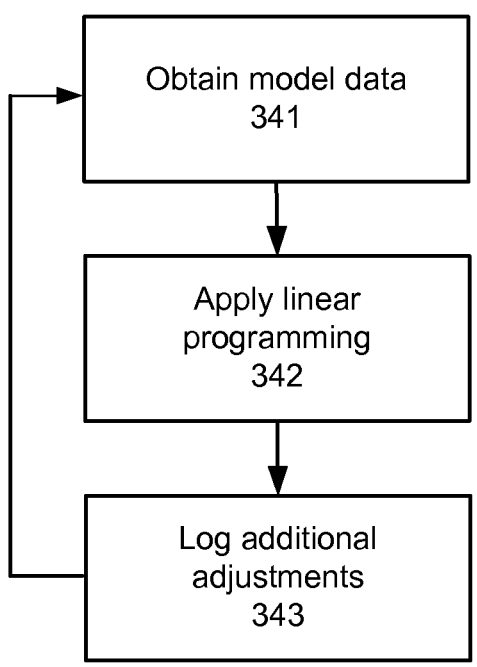

FIG. 3D is a flowchart that illustrates the operations involved in a fourth, linear programming-based alternative technique employed by the adjustment module 119 in one embodiment. Specifically, in a first embodiment, this technique uses linear programming algorithms to minimize the following linear difference problem model:

$$\Sigma_{i,j}[|MA_{i,j}-AA_{i,j}|*nA_{i,j}]$$

Specifically, the variables to be minimized are the $AA_{i,j}$, and $MA_{i,j}$ is the known, measured adjustment between the $i^{th}$ and $j^{th}$ videos, $AA_{i,j}$ is the automatic adjustment between the $i^{th}$ and $j^{th}$ videos that is to be calculated (subject to the constraint $AA_{i,j}=volume_j-volume_i$), and $nA_{i,j}$ is the number of measured adjustments between the $i^{th}$ and $j^{th}$ videos. Thus, the solution for this expression is the set of automatic adjustments $AA_{i,j}$ that, in the aggregate, most nearly approximates the actual measured adjustment values $MA_{i,j}$ of the volume adjustments performed by the users. Viewed another way, the optimal set of values for $AA_{i,j}$ represent the automatic volume adjustments that, if they had been applied at the time that the users performed the actual measured adjustment values $MA_{i,j}$, would have minimized the aggregate user volume changes required to achieve the same effective video volume levels as the users achieved with the actual measured adjustment values $MA_{i,j}$.

Thus, in this embodiment the adjustment calculation module 210 obtains 341 the model data—i.e., the values of $MA_{i,j}$ and $nA_{i,j}$—from the adjustment log 205. The adjustment calculation module 210 then applies 342 a linear programming algorithm to obtain the optimal adjustment values $AA_{i,j}$. The values $AA_{i,j}$ may then be applied for any future user transition between videos $v_i$ and $v_j$.

In a second embodiment applying linear programming, the problem model is a squared difference model expressed as:

$$\Sigma_{i,j}[(MA_{i,j}-AA_{i,j})^2*W(nA_{i,j})]=\Sigma_{i,j}[MA_{i,j}^2*W(nA_{i,j})-2*MA_{i,j}*AA_{i,j}*W(nA_{i,j})+AA_{i,j}^2*W(nA_{i,j})]$$

where $MA_{i,j}$ and $AA_{i,j}$ are as in the first embodiment, and $W(nA_{i,j})$ is a confidence weighting that is some function of the number of observed adjustments (e.g., a function that is logarithmic in $nA_{i,j}$, or proportional to the square root of $nA_{i,j}$). In contrast to the first linear programming embodiment, this embodiment employs a squared difference, and also a confidence weighting. In some embodiments, only the squared difference is employed but not the confidence weighting; in other embodiments, only the confidence weighting is employed, but not the squared difference.

The first derivative of this expression with respect to the variables $AA_{i,j}$ is:

$$\Sigma_{i,j}[(-2*MA_{i,j}*W(nA_{i,j})-2*AA_{i,j}*W(nA_{i,j})]$$

Setting this first derivative equal to 0 will find maxima or minima with respect to the variable $AA_{i,j}$. There are $_NC_2=N*(N+1)/2$ pairs <i, j>, where N is the number of videos, and hence $_NC_2$ equations in $_NC_2$ unknowns. A system of linear equations can be represented and solved using matrices (i.e., M x=A). Even where there is a large number N of videos, most terms will be 0 due to the lack of transition data between the videos $v_i$ and $v_j$, and consequently the corresponding sparse matrix will be feasible to solve.

Regardless of whether the first or the second linear programming embodiment is employed, the volume value for a video is stored in association with the video, and upon transitioning from video $v_i$ to $v_j$, the corresponding $AA_{i,j}$ is computed as the difference of the volume values of videos $v_1$ and $v_j$. As with the above embodiments of FIGS. 3A-3C, additional user adjustments may be logged 343, and steps 341-342 may be repeated at some later point (e.g., repeated daily or weekly) to further refine the computed adjustment data 215.

Figure 3E:
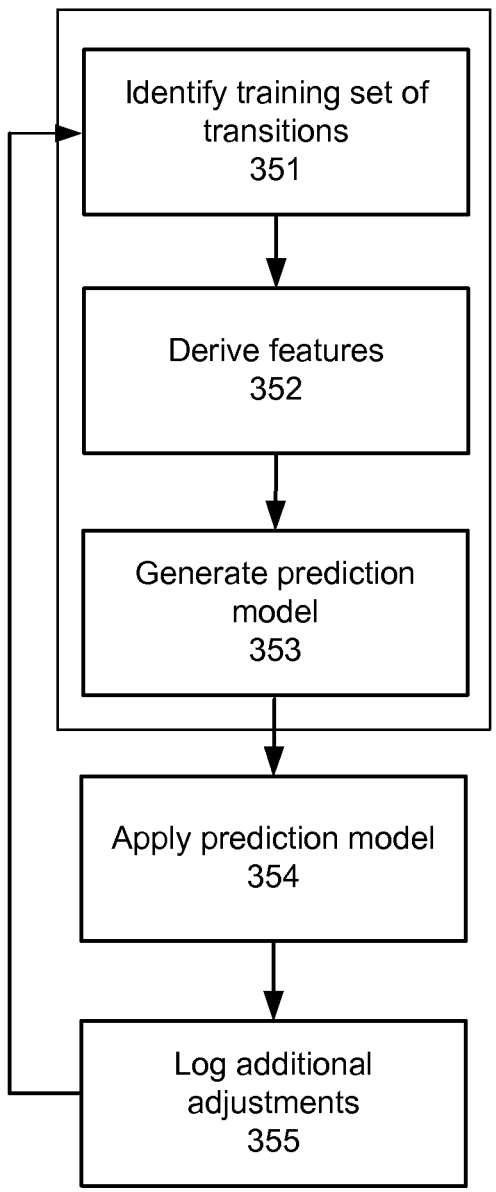

FIG. 3E is a flowchart that illustrates the operations involved in a fifth, machine learning-based alternative technique employed by the adjustment module 119 in one embodiment.

In one embodiment, the adjustment calculation module 210 identifies 351 a random subset of the transition data in the adjustment log 205 as a training set of transitions, labeled with the observed volume adjustment. The adjustment calculation module 210 derives 352, as the features for each of the transitions in the training set, features associated with both the source video and the target video of the transition, as well as the observed volume adjustment itself. In one embodiment the features of a video include:

Features derived from video content (e.g., visual features such as color features, texture features, motion rigidity features, and the like, and/or audio features such mel-frequency cepstrum features)

Video metadata features (e.g., the identity of the uploader of the video, the video channel to which it was uploaded, the type of video (e.g., movie, or music video, or video blog), video duration, video quality, and textual words extracted from user-supplied textual metadata such as the video title or tags)

Using the features for the transitions of the training set, the adjustment calculation module 210 generates 353 a prediction model that correlates (i.e., forms some association between) the observed volume adjustment and the video features of the source video and the target video. The correlation is performed based on machine learning techniques. There are several classes of machine learning techniques, with different algorithms for each class Such algorithms include supervised algorithms like support vector machines (SVM) or nearest neighbor, semi-supervised algorithms such as transductive learning and manifold embedding, and unsupervised learning, such as clustering, latent variable analysis, etc. In one embodiment, kernel logistic regression techniques are employed. The prediction model then serves as the computed adjustment data 215.

Whatever the training algorithm used, the prediction model can be used to estimate the required volume adjustment for a transition between given pair of videos. Specifically, to apply the prediction model in one embodiment, the adjustment application module 220 derives features from the source and target video of the transition in the same manner as that performed by the adjustment calculation module 210 during training. The adjustment application module 220 then provides these features as the input to the prediction model, and when applied 354, the prediction model produces, as output, an estimated relative amount of volume adjustment representing an amount that a typical user would adjust the volume when viewing the target video after having viewed the source video. In another embodiment, the prediction model once to the features of the source video, and again to the feature of the target video, producing, as output for each set of features, the estimated volume level appropriate for the video from which the features were derived; the estimated relative amount of volume adjustment is then the difference between the two estimated volume levels. The adjustment application module 220 accordingly automatically adjusts the video volume by the predicted amount.

As with the embodiments of FIGS. 3A-3D, further user adjustments can be logged and the previous steps may be performed again (e.g., daily or weekly) to refine the computed adjustment data 215 (i.e., the prediction model).

Figure 5:
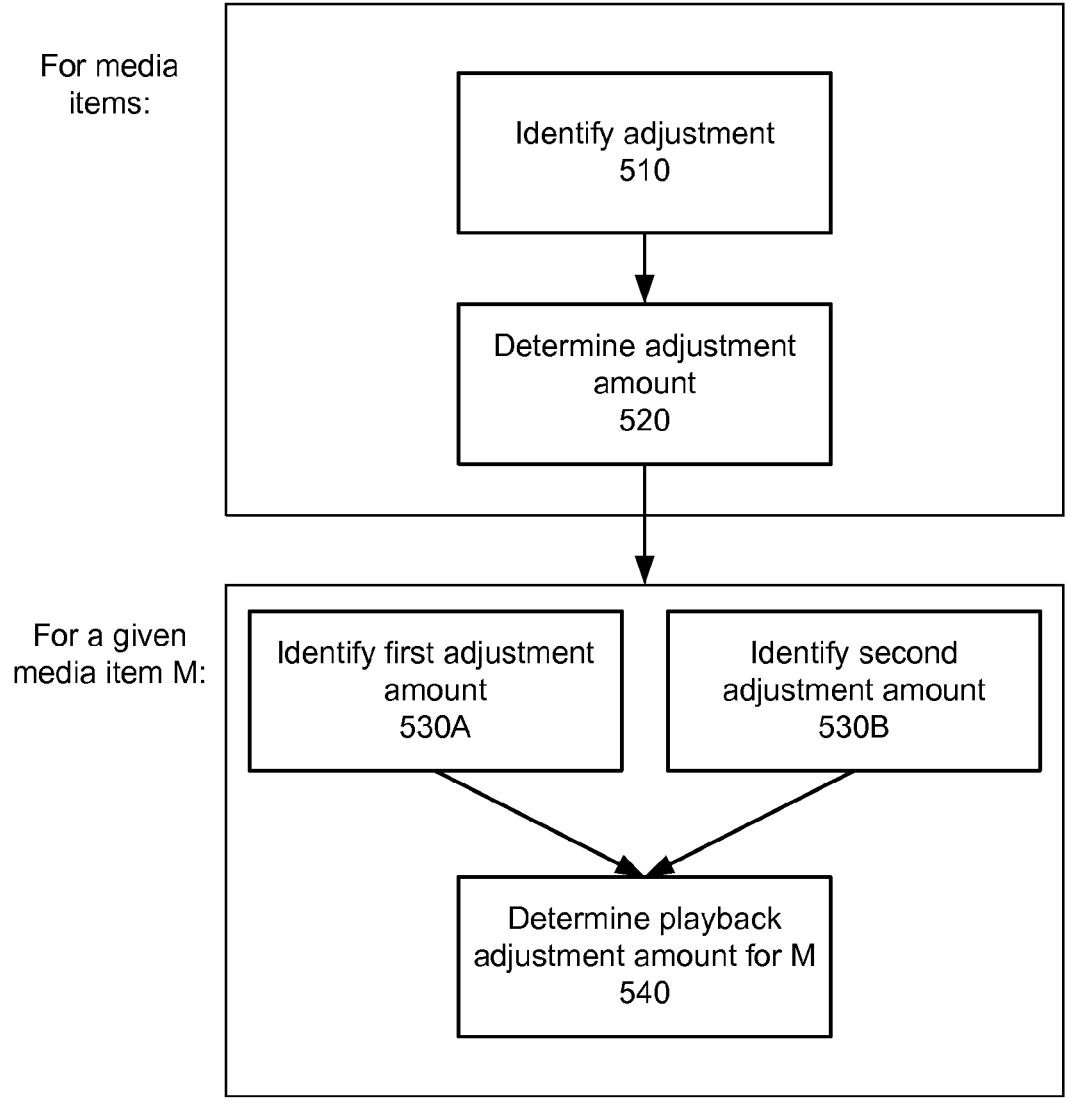
FIG. 5 is a flowchart representing the high-level operations performed by the adjustment module, according to one embodiment.

FIG. 5 is a flowchart representing the high-level operations performed by the adjustment module 119 in any of the above-described embodiments of FIGS. 3A-3E.

For each media item of a plurality of media items (e.g., videos), the adjustment module 119 identifies 510 an adjustment by a user in a playback attribute (e.g., volume) of the media item following a transition to the media item from a directly preceding media item. This adjustment may be logged to the adjustment log by the logging module 202. The adjustment module 119 also determines 520 an adjustment amount in the playback attribute with respect to a measure of the playback attribute during playback of the directly preceding media item, such as a 10% increase in the volume level of the media item, for example. This determination of the adjustment amount may be made by the logging module at the time that a corresponding entry is made in the adjustment log 205, or later on.

Then, for a first media item and a second media item of the media items, the adjustment module 119 identifies 530A a first adjustment amount between the first media item and the second media item. For example, the adjustment module 119 may determine, by consulting the adjustment log 205, that a user increased the volume by 10% after transitioning from a video on penguins to a video on polar bears. The adjustment module 119 also identifies 530B a second determined adjustment amount between either (a) the first media item and a third media item, or (b) the second media item and a third media item. For example, the adjustment module 119 may determine that a user decreased the volume by 20% after transitioning from the video on polar bears to a video on the fjords of Norway.

The adjustment module 119 uses the first determined adjustment amount and the second determined adjustment amount to determine 540 a playback adjustment amount of the playback attribute to apply to the second media item that causes the second media item to appear equivalent to first media item during playback with respect to the playback attribute. Continuing the above example, assume that the user is transitioning from the video on penguins to the video on polar bears. The adjustment module 119 determines the adjustment amount for the volume that will most likely make the video on polar bears have the same perceived volume as the previously-viewed video on penguins, and it does so using the information about the volume adjustment amount between the video on polar bears and the video on the fjords of Norway, as well as the information about the volume adjustment amount between the video on penguins and the video on polar bears. Thus, the adjustment module 119 leverages different sources of information when determining volume adjustment, and is not limited solely to information about the same pair of videos whose volume is to be adjusted.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
   identifying transitions in playing videos, a transition from a first video to a second video representing playing the second video directly following playing the first video;
   for each identified transition:
      determining a first level of volume at which the first video of the transition was played;
      determining a second level of volume at which the second video of the transition was played; and
      determining an amount of user volume adjustment a user has applied based on the first level of volume and the second level of volume;
   identifying a set of videos involved in at least one of the identified transitions;
   for a subset of the videos of the set, forming a graph in which:
      each vertex represents a video of the subset of videos, and
      each edge between a pair of vertices represents a degree of confidence in a corresponding amount of user volume adjustment determined for an identified transition from a video corresponding to one of the vertices in the pair and another video corresponding to the other vertex in the pair;
   forming a spanning tree connecting the subset of videos; and
   for a given pair of videos of the subset of videos where no transition was identified between the pair:
      determining, using the spanning tree, an automatic playback adjustment amount by which to adjust a volume level of one video of the pair in order to cause an effective volume level of the video when played to appear equivalent to an effective volume level of the other video when played.

2. A computer-implemented method comprising: for each media item of a plurality of media items: identifying, during playback of the media item, a first user adjustment being a first relative amount of adjustment in a playback attribute made by a first user responsive to transitioning from a directly preceding media item to the media item; and determining an a second user adjustment being a second relative amount of adjustment in the playback attribute made by a second user responsive to transitioning from the media item to the directly preceding media item; for a first media item and a second media item of the plurality of media items: identifying a third user adjustment between the first media item and the second media item; identifying a fourth user adjustment between: the first media item and a third media item, or the second media item and the third media item; determining, based on the third and fourth user adjustments, an automatic adjustment amount of the playback attribute to apply to playing the second media item that causes the second media item to appear equivalent to the first media item during playback with respect to the playback attribute; identifying a set of media items that were involved in at least one of the transitions; for a subset of the media items of the set, forming a graph including vertices and edges in which: each vertex represents one of the subset of media items, and each edge between a pair of vertices represents a degree of confidence in a corresponding amount of adjustment in the playback attribute determined for an identified transition from a media item corresponding to one of the vertices in the pair and another media item corresponding to the other vertex in the pair; forming a spanning tree connecting the subset of media items; and for a given pair of media items of the subset of media items where no transition was identified between the pair: determining, using the spanning tree, the automatic adjustment amount of the playback attribute to apply to playing one media item of the pair in order to cause an effective level of the playback attribute to appear equivalent when playing the pair of media items.

3. The computer-implemented method of claim 2, further comprising:
   receiving a request from a third user to transition from viewing the first media item to viewing the second media item;
   producing an adjusted playback attribute value by applying the determined automatic adjustment amount to a value of the playback attribute when playing the first media item; and
   playing the second media item such that the playback attribute has the adjusted playback attribute value.

4. The computer-implemented method of claim 2, wherein the first user adjustment is performed by the first user in a web-based user interface for playing the media item.

5. The computer-implemented method of claim 2, wherein the first user adjustment is performed by the first user using a global volume control provided by an operating system of a device used by the first user.

6. The computer-implemented method of claim 2, further comprising: identifying, during playback of a fourth media item, a fifth user adjustment made by a third user in the playback attribute responsive to a transition to the fourth media item from a fifth media item directly preceding the fourth media item; determining, based on other user adjustments made by the third user, that the third user rarely adjusts the playback attribute; and responsive to determining that the third user rarely adjusts the playback attribute, refraining from using the fifth user adjustment when determining an automatic adjustment amount of the playback attribute to apply to playing of media items.

7. The computer-implemented method of claim 2, wherein the first media item, the second media item, and the third media item have audio components, and wherein the playback attribute comprises audio volume level, further comprising:

identifying, during playback of the first media item, a fifth user adjustment made by a third user in the playback attribute responsive to transitioning from the second media item to the first media item; and responsive to determining that the fifth user adjustment represents muting of the volume, refraining from using the fifth user adjustment when determining automatic adjustment amounts of the playback attribute to apply to playing the second media item.

8. The computer-implemented method of claim 2, further comprising: applying a first weighting value to the third user adjustment based on attributes of the transition from the first media item to the second media item; and applying a second weighting value to the third user adjustment based on attributes of the transition from the first media item to the second media item, the first weighting value different from the second weighting value; wherein the automatic playback adjustment amount is determined based on the first weighting value and the second weighting value.

9. The computer-implemented method of claim 2, further comprising: identifying transitions among the plurality of media items in which a fourth media item was involved; determining user adjustments associated with the identified ones of the transitions; and computing an average automatic adjustment amount of the playback attribute to apply to the fourth media item as an average of the determined automatic adjustment amounts.

10. The computer-implemented method of claim 9, further comprising identifying groups of media items such that amounts of identified user adjustments between the media items in a given group are below a threshold amount, wherein determining the automatic adjustment amounts associated with the identified transitions comprises identifying ones of the identified groups corresponding to media items of the identified ones of the transitions.

11. A non-transitory computer-readable storage medium storing instructions executable by a processor, the instructions comprising: instructions for, for each media item of a plurality of media items: identifying, during playback of the media item, a first user adjustment being a first relative amount of adjustment in a playback attribute made by a first user responsive to transitioning from a directly preceding media item to the media item; and determining, during playback of the directly preceding media item, a second user adjustment being a second relative amount of adjustment in the playback attribute made by a second user responsive to transitioning from the media item to the directly preceding media item; instructions for, for a first media item and a second media item of the plurality of media items: identifying a third user adjustment between the first media item and the second media item; identifying a fourth user adjustment between: the first media item and a third media item, or the second media item and the third media item; and determining, based on the third and fourth user adjustments, an automatic adjustment amount of the playback attribute to apply to playing the second media item that causes the second media item to appear equivalent to the first media item during playback with respect to the playback attribute; instructions for identifying a set of media items that were involved in at least one of the transitions; instructions for, for a subset of the media items of the set, forming a graph including vertices and edges in which: each vertex represents one of the subset of media items, and each edge between a pair of vertices represents a degree of confidence in a corresponding amount of adjustment in the playback attribute determined for an identified transition from a media item corresponding to one of the vertices in the pair and another media item corresponding to the other vertex in the pair; instructions for forming a spanning tree connecting the subset of media items; and instructions for, for a given pair of media items of the subset of media items where no transition was identified between the pair: determining, using the spanning tree, the automatic adjustment amount of the playback attribute to apply to playing one media item of the pair in order to cause an effective level of the playback attribute to appear equivalent when playing the pair of media items.

12. The non-transitory computer-readable storage medium of claim 11, the instructions further comprising:

instructions for receiving a request from a third user to transition from viewing the first media item to viewing the second media item;

instructions for producing an adjusted playback attribute value by applying the determined automatic adjustment amount to a value of the playback attribute when playing the first media item; and instructions for playing the second media item such that the playback attribute has the adjusted playback attribute value.

13. The non-transitory computer-readable storage medium of claim 11, the instructions further comprising: instructions for identifying, during playback of a fourth media item, a fifth user adjustment made by a third user in the playback attribute responsive to a transition to the fourth media item from a fifth media item directly preceding the fourth media item; instructions for determining, based on other user adjustments made by the third user, that the third user rarely adjusts the playback attribute; and instructions for responsive to determining that the third user rarely adjusts the playback attribute, refraining from using the fifth user adjustment when determining an automatic adjustment amount of the playback attribute to apply to playing of media items.

14. The non-transitory computer-readable storage medium of claim 11, the instructions further comprising: identifying transitions among the plurality of media items in which a fourth media item was involved; determining user adjustments associated with the identified ones of the transitions; and computing an average automatic adjustment amount of the playback attribute to apply to the fourth media item as an average of the determined automatic adjustment amounts.

15. The non-transitory computer-readable storage medium of claim 11, the instructions further comprising identifying groups of media items such that amounts of identified user adjustments between the media items in a given group are below a threshold amount, wherein determining the automatic adjustment amounts associated with the identified transitions comprises identifying ones of the identified groups corresponding to media items of the identified ones of the transitions.

16. A system comprising: a processor for executing computer program instructions; and a non-transitory computer-readable storage medium comprising computer program instructions executable by the processor, the computer program instructions comprising: identifying transitions in playing videos, a transition from a first video to a second video representing playing the second video directly following playing the first video; for each identified transition: determining a first level of volume at which the first video of the transition was played; determining a second level of volume at which the second video of the transition was played; and determining an amount of user volume adjustment a user has applied based on the first level of volume and the second level of volume; identifying a set of videos involved in at least one of the identified transitions; for a subset of the videos of the set, forming a graph in which: each vertex represents a video of the subset of videos, and each edge between a pair of vertices represents a degree of confidence in a corresponding amount of user volume adjustment determined for an identified transition from a video corresponding to one of the vertices in the pair and another video corresponding to the other vertex in the pair; forming a spanning tree connecting the subset of videos; and for a given pair of videos of the subset of videos where no transition was identified between the pair: determining, using the spanning tree, an automatic playback adjustment amount by which to adjust a volume level of one video of the pair in order to cause an effective volume level of the video when played to appear equivalent to an effective volume level of the other video when played.

17. The computer-implemented method of claim 1, further comprising: receiving a request from a second user to transition from viewing the first media item to viewing the second media item; producing an adjusted volume level by applying the determined automatic playback adjustment amount to a volume level when playing the first media item; and playing the second media item such that the volume level has the adjusted volume level.

18. The computer-implemented method of claim 1, wherein the user adjustment is performed by the user in a web-based user interface for playing the media item.

19. The computer-implemented method of claim 1, wherein the user adjustment is performed by the user using a global volume control provided by an operating system of a device used by the user.

20. The computer-implemented method of claim 1, further comprising: identifying, during playback of the second video, a second amount of user volume adjustment a second user has applied during the transition from the first video to the second video; determining, based on other user volume adjustments made by the second user, that the second user rarely adjusts volume levels; and responsive to determining that the second user rarely adjusts the volume levels, refraining from using the second user volume adjustment when determining the automatic adjustment amount.

21. The computer-implemented method of claim 1, further comprising: identifying, during playback of the first video, a second user volume adjustment made by a second user responsive to transitioning from the second video to the first video; and responsive to determining that the second user volume adjustment represents muting of the volume, refraining from using the second user adjustment when determining the automatic playback adjustment amount.

22. The computer-implemented method of claim 1, further comprising: applying a first weighting value to the amount of user volume adjustment based on attributes of the transition from the first video to the second video; and applying a second weighting value to the amount of user volume adjustment based on attributes of the transition from the first video to the second video, the first weighting value different from the second weighting value; wherein the automatic playback adjustment amount is determined based on the first weighting value and the second weighting value.

23. A non-transitory computer-readable storage medium storing instructions executable by a processor, the instructions comprising: instructions for identifying transitions in playing videos, a transition from a first video to a second video representing playing the second video directly following playing the first video; instructions for, for each identified transition: determining a first level of volume at which the first video of the transition was played; determining a second level of volume at which the second video of the transition was played; and determining an amount of user volume adjustment a user has applied based on the first level of volume and the second level of volume; identifying a set of videos involved in at least one of the identified transitions; instructions for, for a subset of the videos of the set, forming a graph in which: each vertex represents a video of the subset of videos, and each edge between a pair of vertices represents a degree of confidence in a corresponding amount of user volume adjustment determined for an identified transition from a video corresponding to one of the vertices in the pair and another video corresponding to the other vertex in the pair; forming a spanning tree connecting the subset of videos; and for a given pair of videos of the subset of videos where no transition was identified between the pair: determining, using the spanning tree, an automatic playback adjustment amount by which to adjust a volume level of one video of the pair in order to cause an effective volume level of the video when played to appear equivalent to an effective volume level of the other video when played.

* * * * *